(12) United States Patent
Kang

(10) Patent No.: US 9,585,502 B2
(45) Date of Patent: Mar. 7, 2017

(54) WEIGHT TRAINING BEVERAGE MUG

(71) Applicant: Eric Kang, Santa Monica, CA (US)

(72) Inventor: Eric Kang, Santa Monica, CA (US)

( * ) Notice: Subject to any disclaimer, the term of this patent is extended or adjusted under 35 U.S.C. 154(b) by 222 days.

(21) Appl. No.: 14/341,826

(22) Filed: Jul. 27, 2014

(65) Prior Publication Data

US 2016/0022066 A1  Jan. 28, 2016

(51) Int. Cl.
*A63B 21/072* (2006.01)
*A47G 19/22* (2006.01)
*A63B 71/00* (2006.01)
*A63B 21/06* (2006.01)
*B32B 33/00* (2006.01)

(52) U.S. Cl.
CPC ..... *A47G 19/2205* (2013.01); *A47G 19/2227* (2013.01); *A63B 21/0602* (2013.01); *A63B 21/072* (2013.01); *A63B 21/4035* (2015.10); *A63B 71/0054* (2013.01); *A63B 2209/02* (2013.01); *B32B 33/00* (2013.01)

(58) Field of Classification Search
CPC ............ A47G 19/2266; A47G 19/2205; A47G 19/2211; A47G 19/2216; A47G 19/2227; A63B 21/072
USPC .................................................. 220/703–719
See application file for complete search history.

(56) References Cited

U.S. PATENT DOCUMENTS

| | | | | |
|---|---|---|---|---|
| 2,069,089 A | * | 1/1937 | Goldman | A47G 19/2266 220/703 |
| 5,392,948 A | * | 2/1995 | McEntee | A47G 19/23 220/574 |
| 5,570,797 A | * | 11/1996 | Yeh | A47G 23/03 215/228 |
| 6,085,949 A | * | 7/2000 | Zimny | B65D 1/023 222/564 |

(Continued)

FOREIGN PATENT DOCUMENTS

| | | | | |
|---|---|---|---|---|
| CH | DE 202015102329 U1 | * | 9/2015 | ............... A44C 9/00 |
| DE | 867443 C | * | 2/1953 | ......... A47G 19/2266 |

(Continued)

OTHER PUBLICATIONS

Stolzle Oktoberfest Bavarian Isar Beer Mug sold by Keg Works. Information from www.kegworks.com website.

(Continued)

*Primary Examiner* — Joshua Kennedy
(74) *Attorney, Agent, or Firm* — Eric Kang

(57) ABSTRACT

A drinking mug that doubles as an exercise apparatus is formed of non-toxic porcelain ceramic, glass, or wire reinforced glass. The combination of dimensions of the mug adds up to a total mass of at least 1.360 kilograms and possesses the ratio of dimensions of substantially 1, 3.9, 3.9, 2.443, 5.777, and 4.0 between the thickness of a base, diameter of the base, outer diameter of a barrel, inner diameter of the barrel at the end where the barrel connects to the base, height of the barrel, and vertical length of the handle, respectively. A neoprene material lines the base, (Continued)

handle, and the outside barrel surface. A substantially circular brim serves as a surface transition between the inside and outside surfaces of the cylindrical barrel and can contain a plurality of substantially concave scoops, each centered approximately ninety radial degrees offset of the handle.

2 Claims, 2 Drawing Sheets

(56) References Cited

U.S. PATENT DOCUMENTS

| | | | | |
|---|---|---|---|---|
| D453,657 S | * | 2/2002 | Eklin | D7/315 |
| 6,685,047 B1 | * | 2/2004 | Mott | A47G 19/2205 |
| | | | | 215/396 |
| 8,919,592 B2 | * | 12/2014 | Buck | A47G 19/30 |
| | | | | 220/253 |
| 8,926,477 B2 | * | 1/2015 | Lynn | A63B 23/16 |
| | | | | 482/127 |
| 2007/0051735 A1 | * | 3/2007 | Taylor | A63B 21/0602 |
| | | | | 220/603 |
| 2013/0334233 A1 | * | 12/2013 | Vandenlangenberg | |
| | | | | B65D 81/3876 |
| | | | | 220/592.16 |
| 2016/0073807 A1 | * | 3/2016 | Zeitchick | A47G 19/2266 |
| | | | | 426/2 |

FOREIGN PATENT DOCUMENTS

| | | | | |
|---|---|---|---|---|
| EP | WO 9939777 A1 | | 2/2000 | |
| FR | 522974 A | * | 8/1921 | A47G 19/2205 |

OTHER PUBLICATIONS

Crate and Barrel Essential Mug. Information from www.crateandbarrel.com.
CAP Neoprene Coated Dumbbell (SDN4). Information from www.capbarbell.com.

* cited by examiner

WEIGHT TRAINING BEVERAGE MUG

TECHNICAL FIELD

The present invention pertains to an apparatus for beverage consumption and upper extremity muscle conditioning.

BACKGROUND ART

The present invention is comprised of materials that are readily available and affordable for marketability. The basic external profile of the present invention resembles almost any mug in existence.

However, unlike the present invention, many mugs are insignificant in mass and weight. One commercial example presently for sale, the Crate and Barrel Essential Mug, has dimensions of 14.605 centimeters (5.25 inches) width, 10.795 centimeters (4.25 inches) height, 9.525 centimeters (3.75 inches) maximum diameter with a narrowing taper near the mug base, and has a mass of approximately 0.238 kilograms (weighs 0.525 pounds) without liquid and approximately 0.663 kilograms in mass (weighs 1.46 pounds) filled to the brim with 29.57 cubic centimeters (15.0 fluid ounces) of water. Although this weight is reasonable and expected for the singular purpose of consuming beverages, this is barely sufficient for muscle toning and insufficient for muscle strengthening many able-bodied individuals.

Extreme capacity mugs, which may be sufficiently heavy for muscle conditioning, tend to be impractically large for most occasions and may detract from effective multi-tasking, such as office desk work.

A close example of a commercially available heavy mug is the Stolzle Oktoberfest Bavarian Isar Beer Mug, which has a mass of 1.360 kilograms (weighs 2 pounds, 16 ounces) before adding the maximum additional 0.907 kilograms mass (weighs 2.0 pounds or 32.0 fluid ounces or one Liter) of beverage. This weight range is sufficient for muscle conditioning many able-bodied users. Unfortunately, this glass beer mug casts a large profile, with external dimensions of 15.24 centimeters (6.0 inches) wide with handle, 20.002 centimeters (7.875 inches) in height, and 10.16 centimeters (4.0 inches) in diameter. The "Oktoberfest" moniker further suggests its utility is intended for occasional social events, where high consumption is expected within one sitting.

The present invention reconciles the contrasting drawbacks of the two aforementioned mug examples by being both sufficiently heavy for muscle conditioning while remaining externally compact for daily use and further multi-tasking Aside from construction, secondary features are incorporated to maximize utility and safety and contribute to the overall inventive concept of the present invention.

For example, one of the key features of the present invention absent from existing mugs is one or more layers of neoprene or similar material coating the handle and outer surfaces of the mug. Cap Barbell markets dumbbell fitness equipment coated with neoprene to augment grip and comfort while minimizing the chances for hand blisters, calluses, and impact injury compared to all-metal dumbbell. European Publication No. WO1999039777 A1 discloses a barbell or dumbbell with a first layer preferably made of neoprene, which provides padding, and a second layer preferably made of nylon for providing abrasion resistance.

Even though certain individual features are present in other existing device types, the distinction of the invention lies in its integration of various features for a new overall purpose not easily envisioned by any one or a subset of the features in isolation. This innovation is further reinforced by the fact that such features have separately existed for a substantial period and not in the combination as presented.

SUMMARY OF THE INVENTION

Poor time management and lack of motivation to sustain a proper fitness program are recognized factors preventing many individuals from attaining a more desirable physique. Some individuals partially respond to these two factors by multi-tasking fitness with some other desired activity. For example, exercising on a cycle or a treadmill can be done in parallel to watching television. However, since both activities are elective by nature, the issue of motivation has not been fully resolved.

By contrast, the nearly universal daily act of consuming beverages is performed by the majority of the population many times per day. Beverage consumption is typically achieved by having the liquid vessel gripped, lifted, held for drinking, set down, and released. This sequence resembles that of bicep curling, which recruits and conditions muscles from finger flexors in the forearm, biceps, and shoulders. If a special upper extremity fitness device can tap into the combination of regularity and frequency of beverage consumption, then consistency with this particular exercise regimen is automatically enforced.

Furthermore, beverage consumption is often accomplished with a wide variety of other productive tasks, such as office desk work. If the same special device can foster fitness without adversely affecting productivity on other tasks, it would be of even greater value to society.

The present invention makes exercise out of beverage consumption to a higher, safer level than previously available. For the given mass and beverage capacity, the present invention has relatively compact external dimensions and possesses special features that promote safe upper extremity conditioning during beverage consumption without detracting from a wide variety of other simultaneous tasks.

The present invention has a structure made from high density porcelain ceramic, glass, wire reinforced glass, or similar material along with thick cylindrical side and base walls to maximize mass and corresponding weight while maintaining a relatively compact profile. The specified mug design can be offered in several different weights according to the needs of the user. Lighter variants of the mug can also be tailored for the less physically able. The target weight determines the height, diameter, and wall thicknesses of the mug. However, the external form factor is relatively constant across the different weights. As a broad guideline, the dimensions of the base and cylindrical walls correspond to mass that is greater than the target liquid capacity contained by said mug.

In view of the present invention's heavy weight and hard structural material, one or more soft layers cover most outer surfaces of the mug and handle, with the outer most layer having high frictional characteristics for good grip. This feature augments comfort while minimizing the chances of calluses or impact injury with the mug. In addition to material considerations, certain geometric features are implemented to improve other aspects of comfort during use, and detailed in the Description of Preferred Embodiment.

BRIEF DESCRIPTION OF THE DRAWINGS

Non-limiting and non-exhaustive embodiments of the present embodiments are described with reference to the following FIGURES, wherein like reference numerals refer to like parts throughout the various views, unless otherwise specified.

DESCRIPTION OF THE PREFERRED EMBODIMENT

Figure 1:
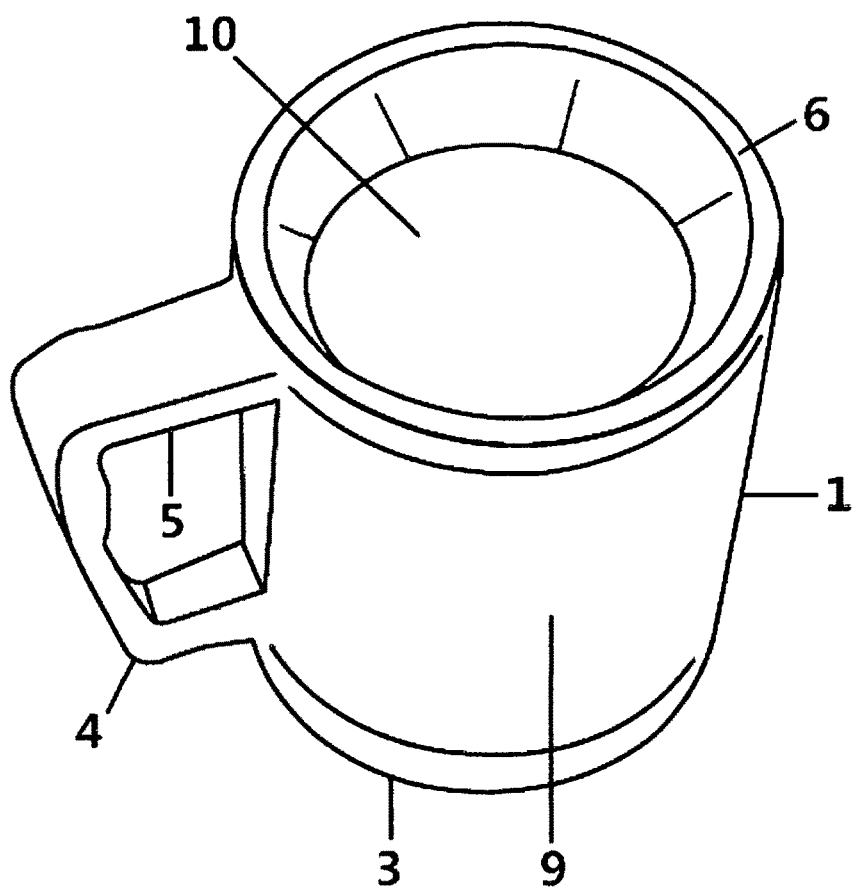
FIG. 1 depicts an overall view of the thin brimmed variant of the weight training mug and neoprene coated outer wall and handle, in accordance with one or more implementations.
Figure 2:
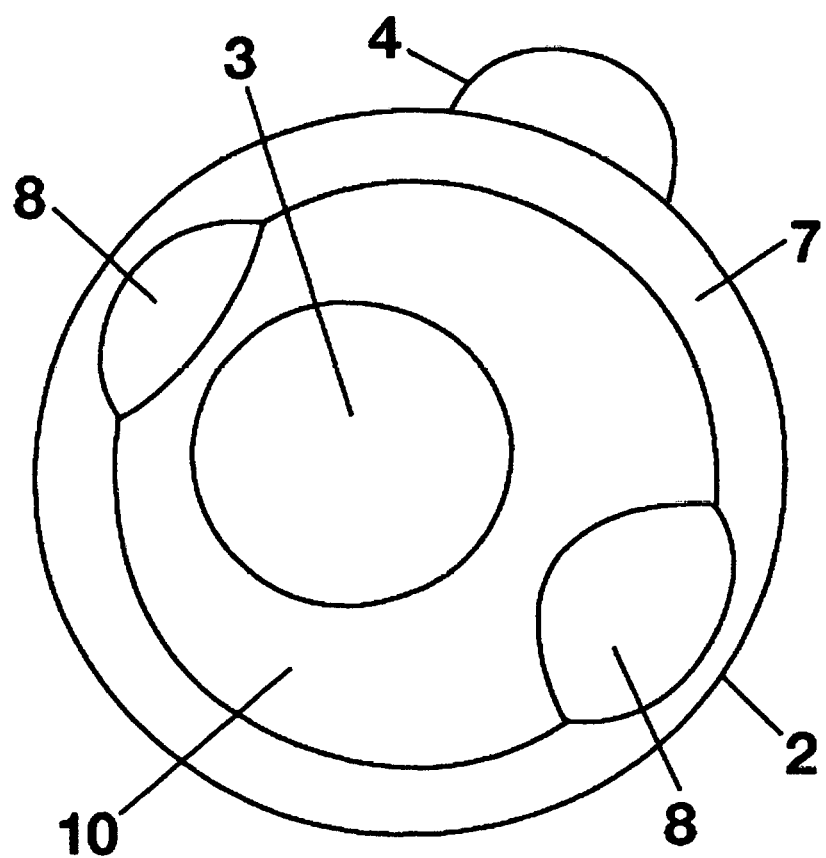
FIG. 2 depicts a nearly top view of the thick brimmed variant of the weight training mug, with two scooped out areas along the brim to facilitate beverage consumption.

Referring now to the drawings wherein like reference numerals refer to similar or identical parts throughout the several views, there is shown a thin cylindrical side wall brim variant of the weight training mug (1) in FIG. 1 and a thick cylindrical side wall brim variant (2) in FIG. 2. Said mug (1, 2) can be made of porcelain ceramic, glass, or other similar materials appropriate for beverage consumption vessels while being more dense than liquid water. Severe-duty variants of said mug (1, 2) may be made from wire reinforced glass. The underlying form of said mug (1, 2) is substantially cylindrical with a solid thick walled bottom or base (3) to close off one end of the cylindrical piece. A thick base (3) also promotes anti-tipping stability. Further mass increases can be achieved by increasing said mug's (1, 2) solid cylindrical wall (9) thickness. For additional stability and mass, said cylindrical wall (9) can be thicker as it nears the base (3), as specifically shown in FIG. 2. The precise dimension of said base wall (3) thickness as well as said cylindrical wall (9) thickness and height are flexibly determined from the target weight and beverage type of the mug, as long as the said base (3) and cylindrical walls (9).

The outer surface of said cylindrical wall (9) is connected to a handle (4). Said handle (4) is large enough for an adult male to completely grasp. Due to said mug's (1, 2) heavy weight, said handle (4) is connected to said cylindrical wall (9) at the top and optionally at the base. To increase mass, said handle (4) is solid. The top portion of said handle (5) connecting to the barrel can optionally have a wide lateral extent to increase the surface area in contact with the index finger that may press against it. This increased surface area distributes and reduces the contact load for improved comfort while grasping the mug. More specifically, said surface (5) in potential contact with the grasping index finger is preferably three to seven centimeters (1.181 to 2.756 inches) wide and can be considered a load spreader surface.

The open ended extent of the apparatus lies the brim (6, 7). To facilitate beverage consumption, said brim (6, 7) could take one of two forms. The simpler form would have said cylindrical wall (9) assuming a high thickness except taper down to a thin wall at the brim (6) to avoid a user from having to stretch his or her jaw uncomfortably wide to drink. The taper occurs from the mug's inner wall (10). At said brim (6), said thinned down wall is preferably approximately 0.159 centimeters (0.0625 inches) thick, as shown in FIG. 1. Instead of having the brim (6) as just described, the present invention can alternatively possess a plurality of scooped out depressions (8) along a brim (7) and portions of said inside cylindrical wall (10). Said scoops (8) are located approximately ninety degrees offset to the handle. Said scoops (8) are areas of locally reduced wall thickness avoid the user from having to stretch his or her jaw uncomfortably wide to drink. Said scoops (8) can be implemented when the wall thickness at the brim (7) exceeds approximately 0.635 centimeters (0.25 inches). The center of the said scoops (8) at said brim (7) corresponds to a minimum local cylindrical wall thickness of approximately 0.159 centimeters (0.0625 inches) thick. The lateral arc length of each said scoop (8), or the width in the tangential direction along said brim (7), is preferably on the order of the width of an adult human mouth, or approximately 5.08-7.62 centimeters (2.0-3.0 inches). Moving toward the base of the mug away from said brim (7), said scoops (8) gradually disappear as it blends into said cylindrical wall (9).

Other features of the present invention include one or more layers of high grip and soft material on the entire said handle (4) and outer surface of said cylindrical wall (9) of the mug. The thickness of the layer is on the order of one to a few millimeters. Neoprene is preferred for the exposed layer or any other materials which possess similar modulus of elasticity and coefficient of friction. The outer surface of said base (3) in contact with said mug's (1, 2) resting surface is optionally coated with the same layers. This outer layer can also be labelled with said mug's (1, 2) weight with and without liquids to apprise the user in advance. Said brim (6, 7) and said mug's inner wall (10) do not have this neoprene or neoprene-like layer.

Example 1

The following is a parametric exercise to illustrate how the present invention can be both heavy and externally compact. The application for this example is a coffee mug that one could have at an office, and will hold the same 29.57 cubic centimeters (15.0 fluid ounces) of water as the aforementioned Crate and Barrel Essential Mug. This coffee beverage application is not intended to be limiting since the inventive aspect of the present invention is invariant to the specific application.

The base wall of the mug is 2.54 centimeters (1.0 inch) thick with a diameter of 9.91 centimeters (3.9 inches). The substantially cylindrical wall sits atop the base to close one end of the beverage vessel and has the same outer diameter as the base and an inner diameter of 6.21 centimeters (2.443 inches). The cylindrical wall thickness is therefore a constant 1.85 centimeters (0.728 inches) for 14.67 centimeters (5.777 inches) of it height. Sitting atop the said constant cross-section cylindrical wall, is a small vertical taper down extension, or 1.27 centimeter (0.5 inch) vertical extension which tapers down the wall thickness to 0.159 centimeters (0.0625 inches) thick at the brim.

Attached to one part of the cylindrical wall at or near the base is a substantially horizontal part of the handle. Attached opposite to the handle-cylindrical wall junction is the substantially vertical portion of the handle. At the top of the vertical portion of the handle is attached another substantially horizontal part of the handle whose opposite end attaches to the cylindrical wall near the top of the mug. Both said substantially horizontal parts of the handle are 5.08 centimeters (2.0 inches) long. The said substantially vertical part of the handle is 10.2 (4.0 inches) long. Although said handle can have any cross-sectional shape, all said three handle elements for this example are constant diameter cylindrical at 1.27 (0.5 inches) diameter and formed as one piece with said mug, and lacks the optional load spreader handle design to simplify illustration of the advantageously small profile for the given mass.

In this example, glass of density 2500 kg/m$^3$ is used. While said mug was described as individual sub-assemblies joined together, there are no fasteners, and said mug structure is expected to be formed as one piece. Excluding the said taper down extension, the construction described so far in this example corresponds to a mass of 2.27 kilograms without liquid (weighs 5.00 pounds) and 2.695 kilograms mass with liquid (weighs 5.94 pounds) filled to capacity. The result is a mug that is significantly heavier than the Oktoberfest Bavarian Isar Beer Mug without being as large. One can surmise that at the same unladen mass of 1.360 kilograms (weighs 2 pounds, 16 ounces) of the Oktoberfest Bavarian Isar Beer Mug, the present invention could be even substantially more compact that just described.

The mass, weight, and dimensions of said example also excludes the relatively small contributions from said neoprene layer for the top portion of the handle.

The invention claimed is:

1. A drinking mug and exercise apparatus combination, comprising:
   a. a substantially cylindrical barrel defining inside and outside surfaces, a substantially circular base, and a handle;
   b. wherein said circular base is placed at one end of said cylindrical barrel;
   c. wherein said handle is connected vertically to said barrel on said outside surface of said barrel so as to permit a person to hold said handle by hand and lift the mug;
   d. wherein said barrel, said base, and said handle are formed of a non-toxic porcelain ceramic, glass, or wire reinforced glass and lined by a neoprene material;
   e. wherein the combination of dimensions of said handle, said base, and said barrel contribute to a total mug mass of at least 1.360 kilograms;
   f. said mug possessing a ratio of dimensions of substantially 1, 3.9, 3.9, 2.443, 5.777, and 4.0 between a thickness of said base, a diameter of said base, a diameter of said outside surface of said barrel, a diameter of said inside surface of said barrel at said one end where said barrel connects to said base, a height of said barrel, and a vertical length of said handle, respectively; and
   g. a substantially circular brim forming a surface transition between said inside and outside surfaces of said barrel;
   h. said brim having a plurality of substantially concave scoops each centered approximately ninety radial degrees offset of said handle creating areas of locally reduced barrel thickness to facilitate drinking from mug.

2. The combination of claim 1:
   a. wherein said concave scoops span a substantially circular or elliptical profile; and
   b. said scoops have a circular diameter or major axis ellipse dimension of approximately 2 to 3 inches.

* * * * *